United States Patent [19]

Shiozawa

[11] Patent Number: 5,134,283
[45] Date of Patent: Jul. 28, 1992

[54] MEANS FOR DETECTING A TILTING STATE WITH A LIGHT EMITTING ELEMENT ON A MOVABLE MEMBER

[75] Inventor: Tatsuo Shiozawa, Iida, Japan
[73] Assignee: Tamagawa Seiki Kabushiki Kaisha, Tokyo, Japan
[21] Appl. No.: 654,757
[22] Filed: Feb. 13, 1991
[30] Foreign Application Priority Data
Oct. 26, 1990 [JP]  Japan .................................. 2-287327
[51] Int. Cl.$^5$ .............................................. G01D 5/34
[52] U.S. Cl. ........................ 250/231.10; 250/211 K; 250/231.12
[58] Field of Search ........... 250/231.10, 231.11, 250/231.12, 231.13, 221, 211 K; 340/689

[56] References Cited
U.S. PATENT DOCUMENTS 3,811,047  5/1974  Shragal ........................... 250/211 K
4,239,963  12/1980  August et al. ..................... 250/231.1
4,584,510  4/1986  Hollow ........................... 250/211 K FOREIGN PATENT DOCUMENTS
60-237313  11/1985  Japan .

Primary Examiner—David C. Nelms
Assistant Examiner—Michael Messinger
Attorney, Agent, or Firm—Brooks Haidt Haffner & Delahunty

[57] ABSTRACT

An optical position detection apparatus, above all, an optical position detection apparatus for detecting the tilting state, such as rolling and pitching of an object, is disclosed. The apparatus includes a light emitting element mounted on a movable member of the object, a condenser lens secured to a lower end of the movable member and a photosensor device provided below the condenser lens for detecting the light radiated by the light emitting element and condensed by the condenser lens.

2 Claims, 2 Drawing Sheets

MEANS FOR DETECTING A TILTING STATE WITH A LIGHT EMITTING ELEMENT ON A MOVABLE MEMBER

BACKGROUND OF THE INVENTION

FIELD OF THE INVENTION

This invention relates to an optical position detection apparatus. More particularly, it relates to detection of tilting states, such as rolling or pitching states, by simplified optical means.

There are known a wide variety of this type of tilt meters. Typical of these is the structure of a dynamically tuned gyro disclosed in, for example, the Japanese Patent Kokai Publication No. 237313/1985, shown herein in FIG. 1.

In this FIG. 1, 1 is a casing substantially in the form of an inverted letter U. A frame 3 having a pair of ball bearings 2 at an axial center thereof is fitted within an inner wall 1a of the casing 1.

A stator 4a having a stator winding 4 is fixedly mounted on an inner wall 3a of the frame 3, and a rotor shaft 5 is rotatably mounted by an inner ball race 2a of each bearing 2.

The frame 3 is secured to an outer ball race 2b of each bearing 2. An annular hysteresis ring 7 is mounted on the outer periphery of a generally U-shaped end cap 6 which is secured to the inner ball race 2a and a lower extremity 5b of the rotor shaft 5. A motor rotor 8 is constituted by the end cap 6 and the hysteresis ring 7, whereas a spin motor 9 is constituted by the stator 4a and the motor rotor 8.

On the top of the rotor shaft 5, a gyro rotor 13 is mounted by means of a hinge unit 12 consisting of a gimbal 10 and a spring member 11. This gyro rotor 13 is constituted by a ring having a substantially U-shaped cross-section. A ring magnet 14 is fixedly mounted on the inner wall of the gyro rotor 13.

A sensor ring 15 is provided at the lower extremity of the gyro rotor 13 and a sensor coil 16 is mounted upright at a position on the frame 3 which is in register with the sensor ring 15.

A torquer coil 17 constituting a torquer unit is provided upright on the upper surface of the frame 3 and has its distal end positioned within the inside of the gyro rotor 13 and in register with the ring magnet 14.

A terminal 20 is provided by means of an insulator 19 on a terminal plate 18 mounted on the lower extremity of the casing 1.

The above-described dynamically tuned gyro operates as follows: When the spin motor 9 is actuated in the state of FIG. 1, the rotor shaft 5 is rotated at an elevated speed for rotating the gyro rotor 13 at an elevated speed by means of the hinge unit 12.

Should a tilt be caused to gyro rotor 13, the tilt state is sensed by sensor coil 16. A control current is caused to flow through torquer coil 17, whereby a force proportional to the product of the magnetic flux through the gyro rotor 13 and the ring magnet 14 and the control current through the torquer coil 17 is produced for controlling the position of the gyro rotor 13.

The above described gyro rotor suffers from the following disadvantages.

Since the tilting state of the rotor rotated by the electric motor is sensed by the magnet and the sensor coil, the gyro has an extremely complex mechanical structure and hence is difficult to assemble it to lower its production costs.

On the other hand, only the tilting angle within a narrow range can be sensed because the angular velocity or the tilting angle that can be sensed is limited by the capacity of the torquer unit and also because the angle that can be sensed by the torquer unit is small. An excessive current flowing through the torquer unit tends to destroy the torquer unit.

OBJECT AND SUMMARY OF THE INVENTION

It is therefore a principal object of the present invention to provide an optical position detection apparatus whereby the tilting state, such as rolling or pitching state, of an object, may be detected by an extremely simplified optical system.

According to the present invention, there is provided an optical position detection apparatus comprising a light emitting element mounted on a movable member, a condenser lens secured to a lower end of the movable member and a photosensor device provided below the condenser lens for detecting the light radiated by the light emitting element and condensed by the condenser lens.

The photosensor device may be arranged as a two-dimensional photosensor device.

With the optical position detection apparatus of the present invention, wherein the light emitting element is provided on the movable member, when the movable member performs a linear movement, the light emitting element performs similar linear movement and the light radiated by the light emitting element is condensed by the condenser lens so as to be detected by the photosensor device.

Since the light from the light emitting element is condensed by the condenser lens, the light spot from the condenser lens is moved with movement of the light emitting element, as that the position of the moving light spot may be read by detecting the coordinate positions thereof with the aid of the photosensor device. It is possible with the two-dimensional photosensor device to detect the two-dimensional positions from the X- and Y-coordinate positions.

With the above described optical position detection apparatus of the present invention, the following advantages may be derived.

Since the light from the light emitting element is detected by the photosensor device, the light may be detected as the light spot on the photosensor device even when the movable member is moved a longer distance such that the light emitting element is out of the light receiving range of the photosensor device. In this manner, a larger displacement of the movable member may also be sensed.

Thus a larger displacement which exceeds the displacement range of the gyro or the detection capacity of the photosensor device and hence which has been impossible to detect with the conventional arrangement can be detected with the detection apparatus of the present invention.

DESCRIPTION OF PREFERRED EMBODIMENT

Figure 1:
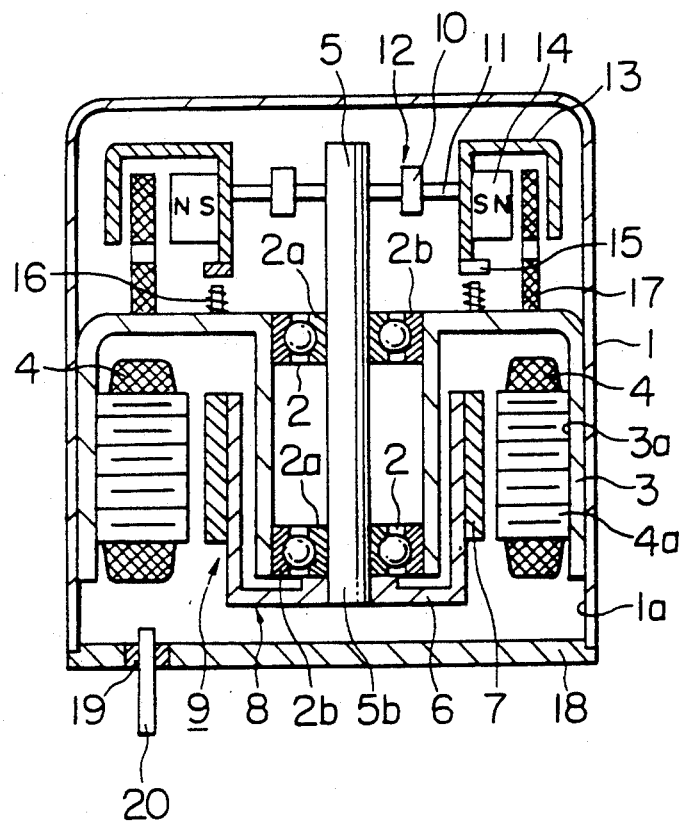
FIG. 1 is a cross-sectional view showing a conventional gyro.

By referring to the drawings, an illustrative embodiment of the present invention will be explained in detail.

Figure 2:
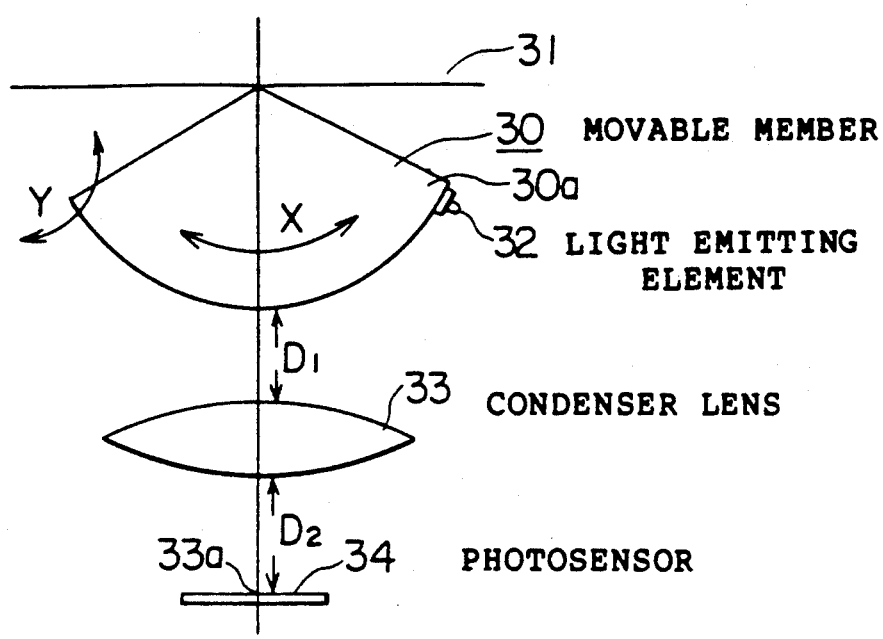
FIG. 2 is a diagrammatic view showing the general arrangement of an optical position detection apparatus according to the present invention.
Figure 3:
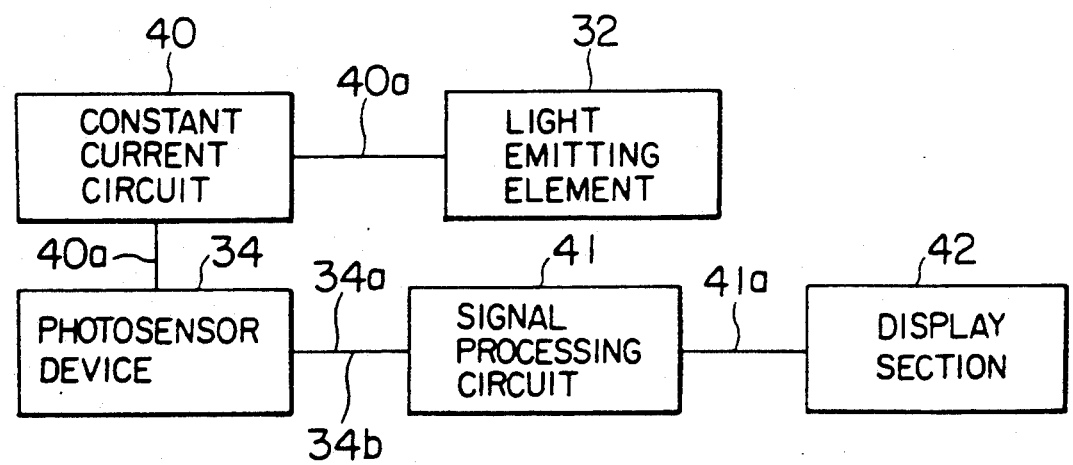
FIG. 3 is a block diagram thereof.

FIGS. 2 and 3 illustrate an optical position detection apparatus according to the present invention. FIG. 2 is a diagrammatic view showing the general construction of the apparatus and FIG. 3 is a block diagram thereof.

In these figures, a movable member 30 is secured to a main member 31 of the optical position detection apparatus. A light emitting element 32 is provided at an end extremity 30a of the movable member 30 for radiating the light downwards.

The movable member 30 is operatively associated with the main member 31 so as to be moved in a first direction as indicated by an arrow X, and in a second direction, normal to the first direction, as indicated by an arrow Y.

A condenser lens 33 is mounted below the movable member 30, at a distance $D_1$ from the movable member, by means of fixing means, not shown. A photosensor device 34 is stationarily mounted below the condenser lens 33, at a distance $D_2$ from the lens 33, by fixing means, not shown.

A constant current 40a is supplied to the light emitting element 32 from the constant current circuit 40, and also to the photosensor device 34. Although the photosensor device 34 may be designed one-dimensionally, the photosensor device 34 is of the two-dimensional type in the case of the present embodiment.

The photosensor device 34 is of the PSD series manufactured by Hamamatsu Photonics Co. Ltd. in which photodiodes having the customary structure are arranged in a matrix configuration so that X-coordinate signals 34a and Y-coordinate signals 34b are entered in a consecutive state to a signal processing circuit 41.

With the aid of the X-coordinate signals 34a and the Y-coordinate signals 34b, the signal processing circuit 41 determines the position on the photosensor device 34 of a light spot 33a from the condenser lens 33 and transmits a corresponding display signal 41a on a display section 42 comprised of a Braun tube (CRT) or a liquid crystal display for displaying the position of the light spot 33a on the display section 42.

What is claimed is:

1. An optical position indicator for the detection of tilting movement comprising a light emitting element mounted fixedly on a movable member for displacement therewith, a fixed condenser lens mounted below said movable member, and a photosensor provided below said condensor lens for detecting light radiated by said light emitting element and condensed by said condenser lens, whereby a tilted condition of said movable member is detected by said photosensor throughout a wide range of displacement of said movable member.

2. The indicator of claim 1 wherein said photosensor is a two-dimensional photosensor device.

* * * * *